Figure 1:
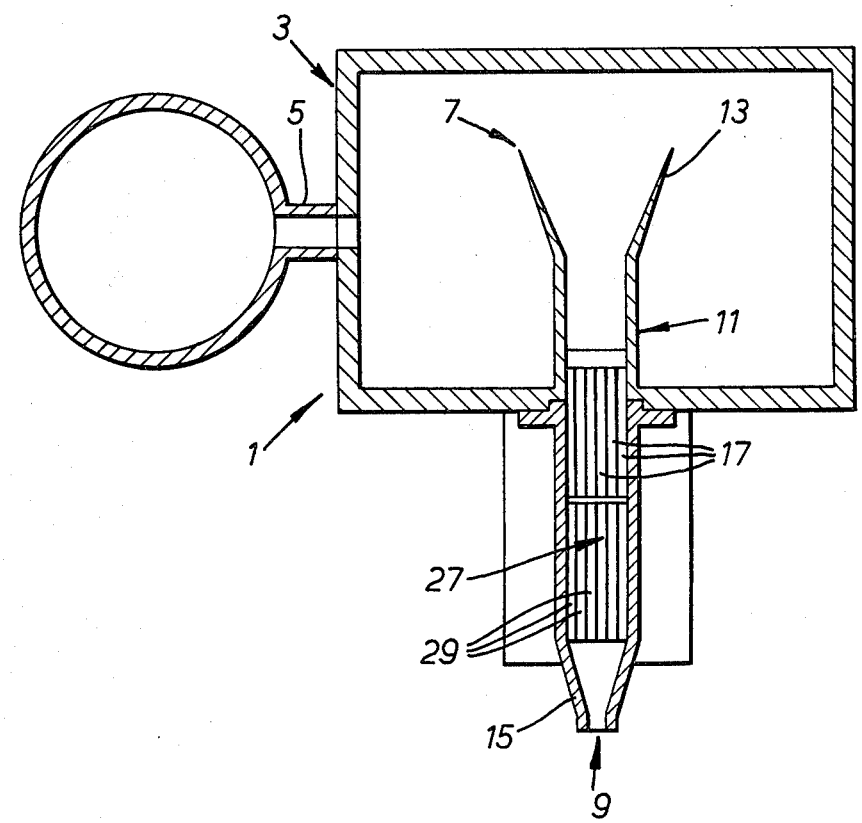

United States Patent [19]

Dobson et al.

[11] Patent Number: 4,466,574

[45] Date of Patent: Aug. 21, 1984

[54] COOLING APPARATUS

[75] Inventors: John C. Dobson, Sheffield; Thomas Hope, Doncaster, both of England

[73] Assignee: Davy McKee Limited, Yorkshire, England

[21] Appl. No.: 367,350

[22] Filed: Apr. 12, 1982

[30] Foreign Application Priority Data

Apr. 13, 1981 [GB] United Kingdom ............... 8111533

[51] Int. Cl.³ ............................................. B05B 1/04
[52] U.S. Cl. ................................. 239/455; 239/590.3; 239/590.5; 239/597
[58] Field of Search ................... 239/455, 590.3, 597, 239/598, 590.5

[56] References Cited

U.S. PATENT DOCUMENTS 1,002,960  9/1911  Berry .................................. 239/455
3,021,609  2/1962  Parkes et al. ..................... 239/597 X
4,210,288  7/1980  Dobson ............................... 239/597

Primary Examiner—Andres Kashnikow
Attorney, Agent, or Firm—Daniel Patch; Suzanne Kikel

[57] ABSTRACT

Apparatus for supplying a coherent curtain of cooling liquid comprises a generally rectangular nozzle with an inlet and an outlet, the nozzle being divided into a multiplicity of individual passages extending in the direction between the inlet and the outlet, a header for introducing liquid coolant to the inlet of the nozzle and a slider displaceable beneath the passages to close off those above the slider and a body carried at the inwards end of the slider providing further passages constituting extensions to those above them and the outer ones of the further passages are inclined outwardly to cause the curtain to diverge as it leaves the nozzle.

9 Claims, 4 Drawing Figures

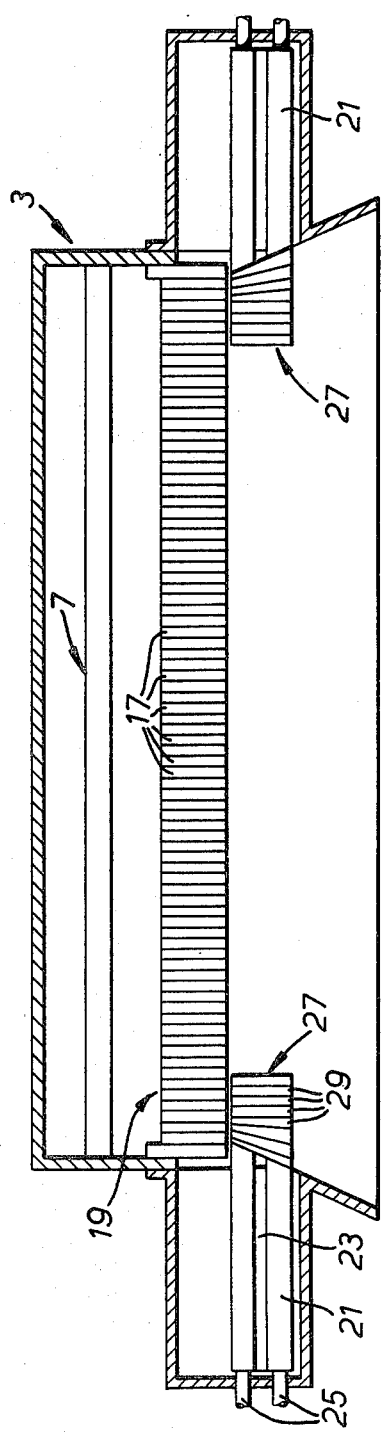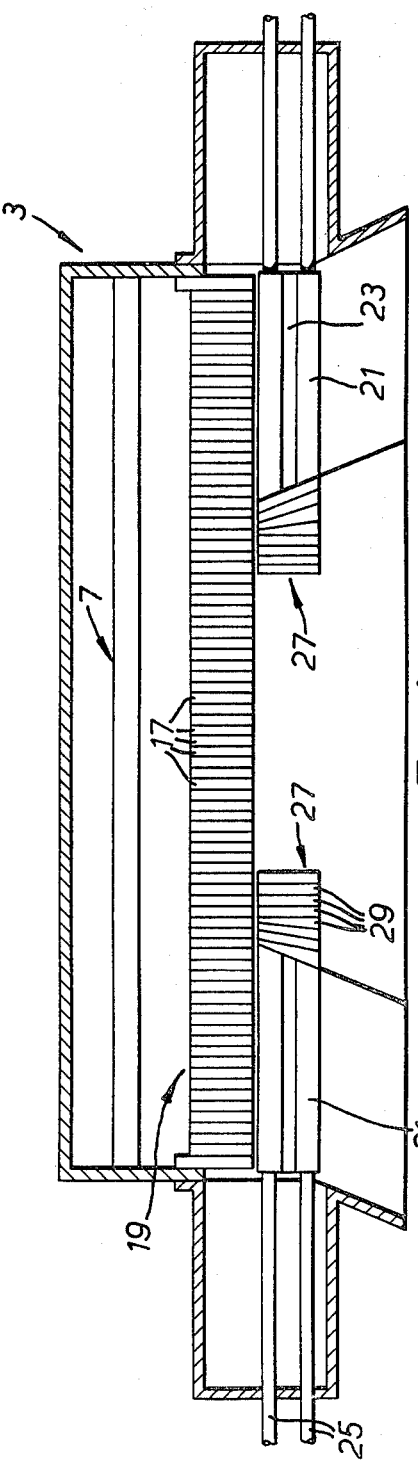

COOLING APPARATUS

BACKGROUND OF THE INVENTION

1. Field of the Invention

This invention relates to cooling apparatus for supplying a coherent curtain of cooling liquid, which is usually water, to a metal workpiece such as strip or plate. By the term "coherent" is meant continuous, that is, without breaks.

2. Description of the Prior Art

In the specification of our U.S. Pat. No. 4,210,288, there is described and claimed apparatus for producing a coherent curtain of liquid coolant. An advantage of the apparatus described and claimed in that application is that the coherent curtain can be in excess of seven feet in height.

The apparatus described in this U.S. patent specification produces a coherent curtain of a nonadjustable width and, so long as the curtain is used to cool hot metal workpieces of substantially the same width, then the apparatus is completely satisfactory. In modern steelworks, however, it is desirable that workpieces of different widths should be rolled by the same rolling apparatus and, consequently, if the cooling apparatus is made sufficiently wide to accommodate the widest workpiece that can be rolled then, for many of the workpieces that are rolled, the curtain is too wide and cooling liquid is wasted at the ends of the workpiece. It would be desirable therefore for cooling apparatus to be provided which can produce a variable width curtain.

SUMMARY OF THE INVENTION

According to the present invention, apparatus for supplying a coherent curtain of cooling liquid comprises
- (a) a nozzle having
  - (i) an inlet being in elongate generally rectangular form,
  - (ii) an outlet being in elongate generally rectangular form and having a considerably narrower cross-section area than said inlet,
  - (iii) an intermediate portion located between said inlet and the outlet and containing division means for dividing the interior of that portion of said nozzle into a multiplicity of individual but contiguous first passages extending in the direction between said inlet and said outlet,
- (b) a header tank for receiving liquid coolant, in which at least the inlet of the nozzle is located, and wherein said outlet of the nozzle commuicates with the outside of said header tank, and
- (c) a slider displaceable beneath said first passages from one end of the nozzle to close off those of the first passages beneath which it extends, and means positioned at the inward end of the slider which provides a group of individual but contiguous second passages which serve as extensions to those of the first passages below which they are positioned, and those of said second passages which are positioned adjacent to the slider having their outlet ends inclined outwardly with respect to the other second passages.

In this way, it is possible to vary the width of the curtain produced by the apparatus simply by displacing the slider inwardly and outwardly from one end of the nozzle. The slider serves to close off those of the passages beneath which it extends. This means that, when the slider is displaced inwardly from one side of the nozzle, the curtain produced by the nozzle is then not symmetrical about the centre of the nozzle but, if a second slider is provided at the opposite end of the nozzle and the two sliders are moved by equal amounts inwardly and outwardly with respect to the first passages, then the width of the curtain can be adjusted and the curtain remains symmetrical about the centre of the nozzle.

Due to surface tension effects, the width of the curtain narrows as it leaves the outlet of the nozzle before engaging the workpiece. To overcome this disadvantage, the or each slider has means positioned at its inward end to provide a group of individual but contiguous passages which serve as extensions to those of the first passages below which they are positioned. These second and third passages have their outlet ends inclined outwardly with respect to the other passages on the slider so that the curtain has a diverging form as it leaves the outlet of the nozzle.

To cool the underside of a workpiece, similar apparatus to that described above is located beneath the path of movement of the workpiece with the outlet of the nozzle directed upwardly so that, in use, liquid coolant flows from the outlet of the nozzle in the form of a curtain which engages the underside of the workpiece. The outlet of the nozzle is conveniently about 10 cms from the undersuface of the workpiece.

Cooling curtains can be applied simultaneously to the top and under surfaces of a hot workpiece and equal rates of cooling to each surface can be achieved.

Figure 2:
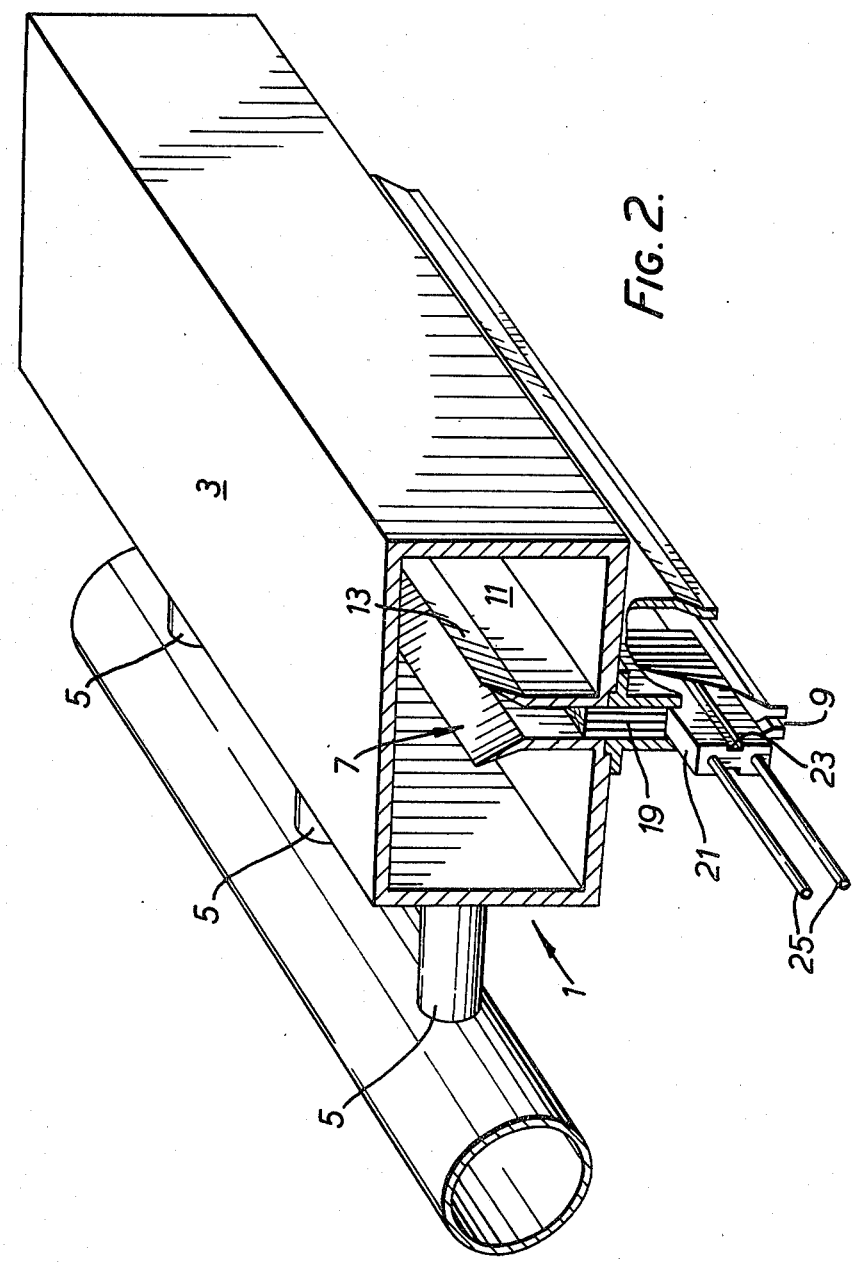

In order that the invention may be more readily understood it will now be described, by way of example only, with reference to the accompanying drawings, in which:

FIG. 1 is a sectional side elevation of apparatus in accordance with the present invention, FIG. 2 is a perspective view of the apparatus with an end portion cut away, FIG. 3 is a sectional side elevation of apparatus shown in FIG. 2, and FIG. 4 is similar to FIG. 3 but with the apparatus actuated to reduce the width of the liquid coolant curtain.

During the manufacture of metal strip or plate, it is necessary to cool the hot rolled material. To this end it is usual to cool the material with liquid coolant, usually water, between the last stand of the rolling mill and the coiling, shearing or levelling apparatus. To ensure that there are uniform metallurgical properties throughout the material, it is essential that each part thereof has the same degree of cooling.

Referring now to the figures, cooling apparatus 1 is mounted above a roller table (not shown) and the outlet from the apparatus is arranged such that a coherent curtain of liquid coolant falls on to the material substantially at right angles to the direction of its movement.

Cooling water is directed into a rectangular closed header tank 3 through a plurality of inlet pipes 5 which are spaced apart along the length of the header.

Inside the header tank there is an inlet 7 of a nozzle which extends substantially the entire length of the header. The outlet 9 of the nozzle is positioned below the header and the inlet and the outlet are each of elongate generally rectangular form but the cross-sectional area of the inlet is considerably greater than that of the outlet. Between the inlet and the outlet, there is a parallel sided portion 11 which is connected at its upper end to the inlet 7 by a convergent portion 13 and the lower end is connected to the outlet by a further convergent portion 15.

Within the portion 11, there is a multiplicity of individual but contiguous passages 17 which extend in the direction between the inlet and the outlet. The passages are defined by an insert 19 of metal or plastics material. As an alternative to the insert, a plurality of separate tubes, which may be of rectangular or other convenient cross-section, may be located in the nozzle.

Referring particularly to FIG. 2, it can be seen that below the insert 19 providing the passages 17, there is a slider in the form of a block 21 which is guided by a recess 23 running along its length in the portion of the duct. This slider is displaceable beneath the first passages from one end of the nozzle and serves to close off those of the passages beneath which it extends. A pair of rods 25 serve to displace the slider within the duct.

As can be seen more clearly from FIGS. 3 and 4, at the inward end of the slider 21, there is a body 27 which provides a group of individual but contiguous second passages 29 which are of substantially the same cross-section and the same separating pitch as the passages 17 and they serve as extensions to those of the first passages 17 below which they are positioned. This body is secured to the slider so that, by moving the slider inwardly beneath the passages 17, the passages are closed off from the end of the nozzle and, at the inwards end of the slider, the passages 29 form extensions for those immediately above them. Those of the second passages which are positioned adjacent to the slider have their outlet ends inclined outwardly with respect to the other second passages and the passages are inclined relative to the remaining non-inclined second passages through angles which progressively increase towards the slider. These non-vertical passages give a horizontal component of velocity to the coolant liquid at the ends of the curtain so that, as the curtain leaves the nozzle, it is divergent. The surface tension effects, previously mentioned, operate to draw inwardly the edges of the curtain with the result that the divergence is progressively reduced as the water falls and, in fact, the divergence may change to a nondivergence before the curtain engages with the workpiece.

Although a slider need only be provided at one end of the nozzle, it is clearly advantageous to have a curtain which is symmetrical with respect to the nozzle and, consequently, in the arrangement shown in FIGS. 3 and 4, there is a slider 21 at each end of the nozzle and, at the inwards end of each slider, there is a body 27 which provides the secondary passages.

As shown in FIG. 4, the sliders have been moved inwardly of the nozzle so that a curtain of width about one third of the maximum width of the nozzle is obtained.

What we claim as our invention and desire to secure by Letters Patent is:

1. A cooling apparatus for supplying a continuous curtain of cooling liquid comprising:
   (a) a nozzle having
      (i) an inlet being in elongate generally rectangular form,
      (ii) an outlet being in elongate generally rectangular form and having a considerably narrower cross-section area than said inlet,
      (iii) an intermediate portion located between said inlet and the outlet and containing division means for dividing the interior of that portion of said nozzle into a multiplicity of individual but contiguous first passages extending in the direction between said inlet and said outlet,
   (b) a header tank for receiving liquid coolant, in which at least the inlet of the nozzle is located, and wherein said outlet of the nozzle communicates with the outside of said header tank, and
   (c) a slider displaceable beneath said first passages from one end of the nozzle to close off those of the first passages beneath which it extends, and means positioned at the inward end of the slider which provides a group of individual but contiguous second passages which serve as extensions to those of the first passages below which they are positioned, and those of said second passages which are positioned adjacent to the slider having their outlet ends inclined outwardly with respect to the other second passages.

2. Apparatus as claimed in claim 1, in which the second passages positioned adjacent to the slider are inclined relative to the remaining non-inclined second passages through angles which progressively increase towards the slider.

3. Apparatus as claimed in claim 1, in which the means on the slider providing the second passages is a body providing a plurality of second passages.

4. Apparatus as claimed in claim 1, in which the slider is in the form of a block guided in the portion of the nozzle containing the means which provide the first passages.

5. Apparatus as claimed in claim 1, in which a second slider is displaceable beneath said first passages from the opposite end of the nozzle to the first-mentioned slider to close off those of the first passages beneath which it extends and means positioned at the inward end of the second slider which provides a group of individual but contiguous third passages which serve as extensions to those of the first passages below which they are positioned and those of the third passages which are positioned adjacent to the second slider having their outlet ends inclined outwardly with respect to the other third passages.

6. Apparatus as claimed in claim 5, in which the third passages positioned adjacent to the slider are inclined relative to the remaining third passages through angles which progressively increase towards the second slider.

7. Apparatus as claimed in claim 5, in which the means on the slider providing the third passages is a body providing a plurality of third passages.

8. Apparatus as claimed in claim 5, in which the second slider is in the form of a block guided in the portion of the nozzle containing the means which provide the first passages.

9. A cooling apparatus according to claim 1, wherein said second passages are of substantially the same cross section and the same separating pitch as that of said first passages.

* * * * *